US011442159B2

(12) United States Patent
Babakhani et al.

(10) Patent No.: US 11,442,159 B2
(45) Date of Patent: Sep. 13, 2022

(54) MULTI-SPECTRAL THZ MICRO-DOPPLER RADAR BASED ON SILICON-BASED PICOSECOND PULSE RADIATORS

(71) Applicant: The Regents of the University of California, Oakland, CA (US)

(72) Inventors: Aydin Babakhani, Los Angeles, CA (US); Seyedmohammadreza Razavian, Los Angeles, CA (US); Mahdi Assefzadeh, Winter Springs, FL (US); Mostafa Hosseini, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 98 days.

(21) Appl. No.: 16/931,936

(22) Filed: Jul. 17, 2020

(65) Prior Publication Data

US 2021/0018610 A1   Jan. 21, 2021

Related U.S. Application Data

(60) Provisional application No. 62/876,485, filed on Jul. 19, 2019.

(51) Int. Cl.
*G01S 13/50* (2006.01)
*G01S 7/28* (2006.01)
*G01S 7/40* (2006.01)

(52) U.S. Cl.
CPC .............. *G01S 13/505* (2013.01); *G01S 7/28* (2013.01); *G01S 7/4095* (2021.05)

(58) Field of Classification Search
CPC ......... G01S 13/505; G01S 7/28; G01S 7/4095
USPC ....................................... 342/28, 371, 357.67
See application file for complete search history.

(56) References Cited

U.S. PATENT DOCUMENTS

| | | | | |
|---|---|---|---|---|
| 2004/0018018 | A1* | 1/2004 | Izadpanah | F16K 37/0075 398/77 |
| 2012/0299770 | A1* | 11/2012 | Lee | G01S 19/20 342/357.67 |
| 2015/0263424 | A1* | 9/2015 | Sanford | H01Q 15/08 342/371 |
| 2018/0052186 | A1* | 2/2018 | Su | G01Q 60/32 |

FOREIGN PATENT DOCUMENTS

WO     2020264279 A1    12/2020

* cited by examiner

*Primary Examiner* — Bo Fan
(74) *Attorney, Agent, or Firm* — KPPB LLP (57) ABSTRACT

Systems and methods for modulation and demodulation using a micro-Doppler effect are described. In an embodiment, the method includes radiating, using a picosecond pulse generator with an antenna, a train of THz pulses that form a frequency comb, where the frequency comb is reflected from an object such that the frequency several tones in the frequency comb are shifted based on the speed of the object and demodulating the reflected frequency comb to recover a THz Doppler signature of the object.

20 Claims, 8 Drawing Sheets

Fig. 4. Graphical illustration of the THz tones' down-conversion to IF.

Fig. 1. Emergence of side tones because of vibration.

FIG. 1

Fig. 2. Measurement setup for modulation and demodulation of sound waves using micro-Doppler effect.

FIG. 2

Fig. 3. Modified experimental setup for phase noise suppression.

FIG. 3

Fig. 4. Graphical illustration of the THz tones' down-conversion to IF.

Fig. 5. A photo of the measurement setup for sound vibrometry.

FIG. 5

Fig. 6. Spectrogram of a recovered 30-sec chirp sound.

Fig. 7. Comparison between a) the original sound and b) the recovered sound track.

FIG. 8

MULTI-SPECTRAL THZ MICRO-DOPPLER RADAR BASED ON SILICON-BASED PICOSECOND PULSE RADIATORS

CROSS-REFERENCE TO RELATED APPLICATIONS

The current application claims priority to U.S. Provisional Application No. 62/876,485, entitled "Vibration Sensing and Long-Distance Sounding with THz Waves" to Babakhani et al., filed Jul. 19, 2019, the disclosure of which is incorporated herein by reference in its entirety.

STATEMENT OF FEDERALLY SPONSORED RESEARCH

This invention was made with government support under Grant Number 1830123, awarded by the National Science Foundation. The government has certain rights in the invention.

FIELD OF THE INVENTION

The present invention generally relates to THz micro-Doppler Radar based on silicon-based picosecond pulse radiators.

BACKGROUND

The Doppler effect has been widely used in radar engineering to classify and measure the speed of moving objects such as drones and airplanes. Similarly, the micro-Doppler phenomenon, which roots from the Doppler effect, has been used to detect the micro-motion signatures of objects. This effect has been used to characterize, identify, and distinguish moving objects. For example, a frequency of a heart beat has been measured using an ultra-wide band radar. Likewise, for example, a 160-GHz radar has been used to sense throat vibrations and reconstruct speech.

The micro-Doppler phenomenon in the THz regime can be used for non-contact based vibrometry. Long distance propagation of THz waves can enable remote sensing and vibrometry of distance targets. The surface micro-vibrations can modulate the frequency of the incident electromagnetic waves. Hence, by demodulating and processing the reflected waves, the signature of the vibrations can be recovered. Due to strong Doppler effect at THz frequencies, THz band has been of great interest to researchers for non-contact based vibrometry applications.

BRIEF SUMMARY OF THE INVENTION

Systems and method for modulation and demodulation using a micro-Doppler effect are described. In an embodiment, the method includes: radiating, using a picosecond pulse generator with an antenna, a train of THz pulses that form a frequency comb, where the frequency comb is reflected from an object such that the frequency of a plurality of tones in the frequency comb are shifted based on the speed of the object, and demodulating the reflected frequency comb to recover a THz Doppler signature of the object.

In a further embodiment, the antenna is on-chip and the train of THz pulses are generated on-chip and radiated by the on-chip antenna.

In still a further embodiment, the reflected frequency comb from the object is downconverted with another frequency comb and demodulated.

In yet still a further embodiment, the reflected frequency comb from the object is demodulated with a single tone.

In still a further embodiment, the method includes identifying the object using a combination of the THz Doppler signature in a broad THz frequency range and the non-Doppler reflection from the object.

In yet a further embodiment again, different parts of the object move at different speeds and the reflected frequency comb includes several THz Doppler tones.

In yet a further embodiment again, the object vibrates at a frequency equal or close to its mechanical resonance frequencies and the reflected frequency comb includes several THz Doppler tones such that the THz Doppler tones are generated due to the vibration of the object.

In still a further embodiment, the THz Doppler signature caused by the vibration of the object is used to determine the object's mechanical and structural properties and predict failures in the object, where the object is at least one of a bridge, drone, plane, and building.

In still a further embodiment again, the THz Doppler signature of the object is used along with a THz hyperspectral signature of the object to classify the object and determine at least one of its mechanical, physics, and chemical properties.

In still a further embodiment, the THz Doppler signature of the object is produced for multiple positions corresponding to different pixels of a distributed object such that each tone of the Doppler signature produced by each pixel of the object is combined to produce a Doppler image such that each pixel in the image represents a Doppler signature of a part of the object.

In still a further embodiment, the electromagnetic wavelength of THz Doppler tones incident on the object is much smaller than the size of the object such that the frequency comb can be focused on only a section of the object and Doppler signatures are produced for that particular section.

In still a further embodiment, the position of the focused frequency comb on the object is steered to produce at least one of a two and three dimensional image such that each pixel of the image contains a Doppler signature primarily generated by the part of the object that is located at the focused position.

In still a further embodiment, the electromagnetic wavelength of THz tones incident on the object is much smaller than the size of the object such that the frequency comb can be focused on only a section of the object and the Doppler signatures are primarily generated by that particular section.

In still a further embodiment, the THz Doppler signature is used to detect gas leaks in a pipeline such that the density of the gas changes the absorption of THz waves and a periodic movement of the gas generates the THz Doppler signature.

In still a further embodiment, the THz Doppler signature is used to determine the flow type of at least one of a gas and ions in a plasma, wherein the flow type is at least one of bubbly, slug, chum, annular, mist bubble, interacting bubble, churn turbulent bubble, and clustered bubble.

In still a further embodiment, the method includes collimating, using a plurality of off-axis parabolic mirrors, the train of THz pulses at a transmitter and focusing the train of THz pulses on an antenna on a receiver side, directing, using a several mirrors, the collimated beam, and retrieving a base-band signal.

In still a further embodiment, the antenna is a horn antenna.

In still a further embodiment, the method includes feeding a trigger of the pulse radiator using a low-phase-noise input trigger, and increasing, using a silicon lens, the on-chip antenna radiation efficiency and gain of the pulse radiator.

In still a further embodiment, a frequency of the radiated tones is locked to a low-phase noise external source.

In still a further embodiment, a phase noise of a local oscillator (LO) and the radiated tones remain correlated to mitigate phase noise degradation of the radiated tones by feeding a same input to the picosecond pulse generator chip and the LO.

DETAILED DESCRIPTION OF THE DRAWINGS

Turning now to the drawings, THz vibrometry using a picosecond pulse radiator in accordance with embodiments of the invention are illustrated. In particular, THz vibrometry is based on the micro-Doppler phenomenon, in which the periodic movement of radar targets modulates the frequency of the electromagnetic waves reflected from their surface. The modulation can depend on the amount of surface displacement and the carrier frequency. Since the micro-Doppler effect is stronger at higher frequencies, vibrometry in THz band can benefit from higher sensitivity compared to RF and mm-wave. In many embodiments, sound vibrations with the frequency ranging from 100 Hz to 1 kHz can be used to modulate THz carrier tones produced by a broadband THz pulse radiating silicon chip. For example, a music track, a chirp sound, and multiple frequency tones can be produced by a speaker, and then recovered by the down-conversion of the modulated THz tone and analog demodulation at the receiver. In many embodiments, a phase-noise reduction technique can be used to boost the sensitivity of low-frequency micro-Doppler detection.

In many embodiments, a custom picosecond pulse radiator may be used for THz radiation and in particular to the generation of a frequency comb. The details of picosecond pulse radiators that can be used for THz radiation and frequency comb generation in the THz regime in accordance with many embodiments of the invention are described in detail in PCT Patent Application PCT/US2020/039800, entitled "THz Impulse and Frequency Comb Generation Using Reverse Recovery of PIN Diode", filed on Jun. 26, 2020, the entirety of which is hereby incorporated by reference in its entirety. In many embodiments, the pulse radiator chip can produce a broadband frequency comb ranging from 10 s of GHz to 1.1 THz. In many embodiments, the spacing between adjacent tones can be set by the frequency of the input trigger. In many embodiments, by using a frequency comb, the micro-Doppler effect can be analyzed for many THz tones providing more information regarding the properties of an object. By generating a frequency comb in the THz regime, different Doppler signatures can be measured for an object. Based on the vibrations and/or movement of the object, each tone in the frequency comb can be shifted providing a multi-spectral Doppler measurements in the THz regime. By obtaining information about the Doppler shift on every tone, many embodiments are able to provide more information on the Doppler signature of the object. The information can be used to identify various properties of the object.

Described below includes the development of the theory of FM modulation for sound vibrations, and then the details of the experimental setups in accordance with many embodiments of the invention.

Micro-Doppler Analysis

Figure 1:
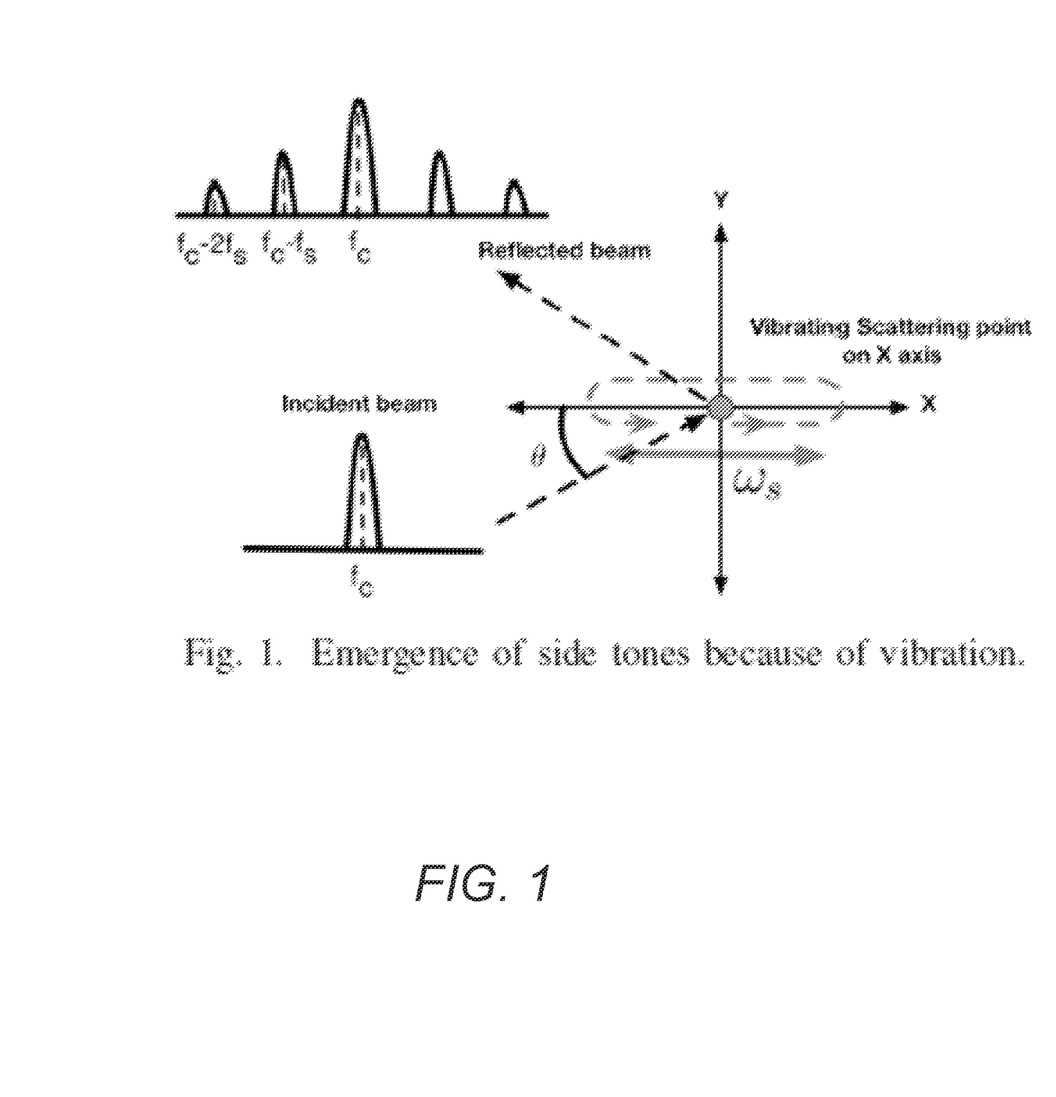
FIG. 1 illustrates a micro-Doppler effect on a reflected beam from a surface that vibrates with an angular velocity of Ws in accordance with an embodiment of the invention.

A micro-Doppler effect on a reflected beam from a surface that vibrates with an angular velocity of $\omega_s$ in accordance with an embodiment of the invention is illustrated in FIG. 1. The reflected signal can be written as, $$R(t) = A \cos \left( 2\pi f_c t + 2\pi \int f_d(t) dt \right) \quad (1)$$

and $$f_d(t) = \frac{2v(t) \cos(\theta)}{c} f_c \quad (2)$$

$$v(t) = D\omega_s \cos(\omega_s t) \quad (3)$$

where $f_d(t)$ is the instantaneous frequency shift, $f_c$ is the carrier frequency (frequency of the tone), v(t) is the instantaneous velocity of the reflecting surface, D is the amplitude of the vibration (displacement), c is the velocity of the electromagnetic wave, and θ is the angle between the vibration direction and the incident wave. Thus, (1) can be expanded in the following explicit form:

$$R(t) = A \cos \left( \omega_c t + \frac{2D \cos(\theta)\omega_c}{c} \sin(\omega_s t) \right) \quad (4)$$

$$= A \sum_{k=-\infty}^{\infty} J_k(\beta) \cos((\omega_c + k\omega_s)t)$$

where J is the Bessel function and β is the modulation index (modulation depth) of the FM modulation, which is directly proportional to the carrier frequency. Hence, by increasing the carrier frequency, a larger modulation depth and a wider bandwidth can be achieved. Table I below illustrates the power of the modulated tones in dBc for different displacements when θ=0, and $f_c$=400 GHz.

TABLE 1

Effect of Displacement Factor.

| D (µm)     | 1000  | 500   | 200  | 100  | 50   | 10    | 1     |
|------------|-------|-------|------|------|------|-------|-------|
| β          | 16.7  | 8.4   | 3.3  | 1.7  | 0.84 | 0.17  | 0.017 |
| £@fa (dBc) | −14.6 | −11.3 | −14  | −4.9 | −8.4 | −21.5 | −41.5 |

A factor that may determine the lower limit of detectable vibration frequency and overall quality of the recovered sound can be the linewidth of the carrier frequency tone. Narrow spectral linewidth and low phase noise may be necessary for the detection of low-frequency vibrations. Particularly, this issue can be more critical at millimeter-wave and THz frequencies, where oscillator-based radiators suffer from poor phase-noise and frequency instability. To mitigate this problem, in many embodiments, the frequency of the radiated tones is locked to a low-phase noise external source. However, due to the inherent frequency multiplication in pulse radiators, the phase noise of the high-frequency radiated tones degrades based on the following:

$$\mathcal{L}_{N\!f_0} = 20\log(N) + \mathcal{L}_{f_0} \quad (5)$$

where N is the multiplication factor and $f_0$ is the input trigger frequency of the chip. It should be noted that 10-dB linewidth of all the radiated tones is less than 2 Hz. Described in detail below, a phase-noise reduction technique can be used that can compensate the phase noise degradation caused by frequency multiplication.

Experimental Setup

In many embodiments, a 130-nm SiGe BiCMOS picosecond pulse radiator based on PIN diode reverse recovery can be used as the radiating source. The details of picosecond pulse radiators that can be used for THz radiation in accordance with many embodiments of the invention are described in detail in PCT Patent Application PCT/US2020/039800, entitled "THz Impulse and Frequency Comb Generation Using Reverse Recovery of PIN Diode", filed on Jun. 26, 2020, the entirety of which is hereby incorporated by reference in its entirety. In an experiment, the repetition rate of the radiating pulses can be set at 5.5 GHz, which results in a frequency comb with 5.5 GHz spacing between adjacent tones.

Due to the high dielectric constant of silicon substrate, the radiation of the on-chip antenna can be coupled to the substrate modes. Hence, in many embodiments, a hemispherical silicon lens is placed on the back of the chip to eliminate the substrate modes and increase the total radiation efficiency.

Figure 2:
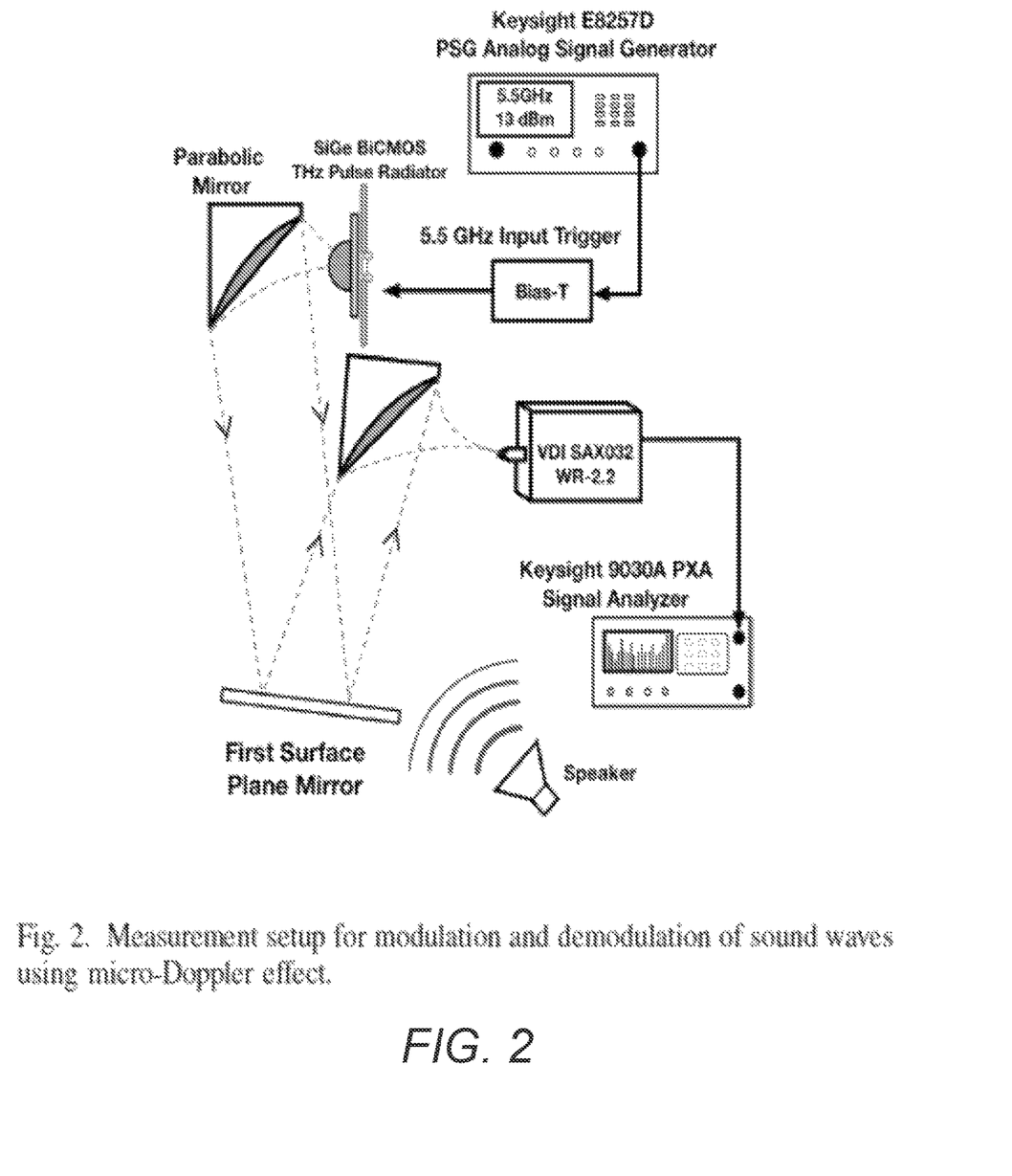
FIG. 2 illustrates a measurement setup for modulation and demodulation of sound waves using micro-Doppler effect in accordance with an embodiment of the invention.
Figure 5:
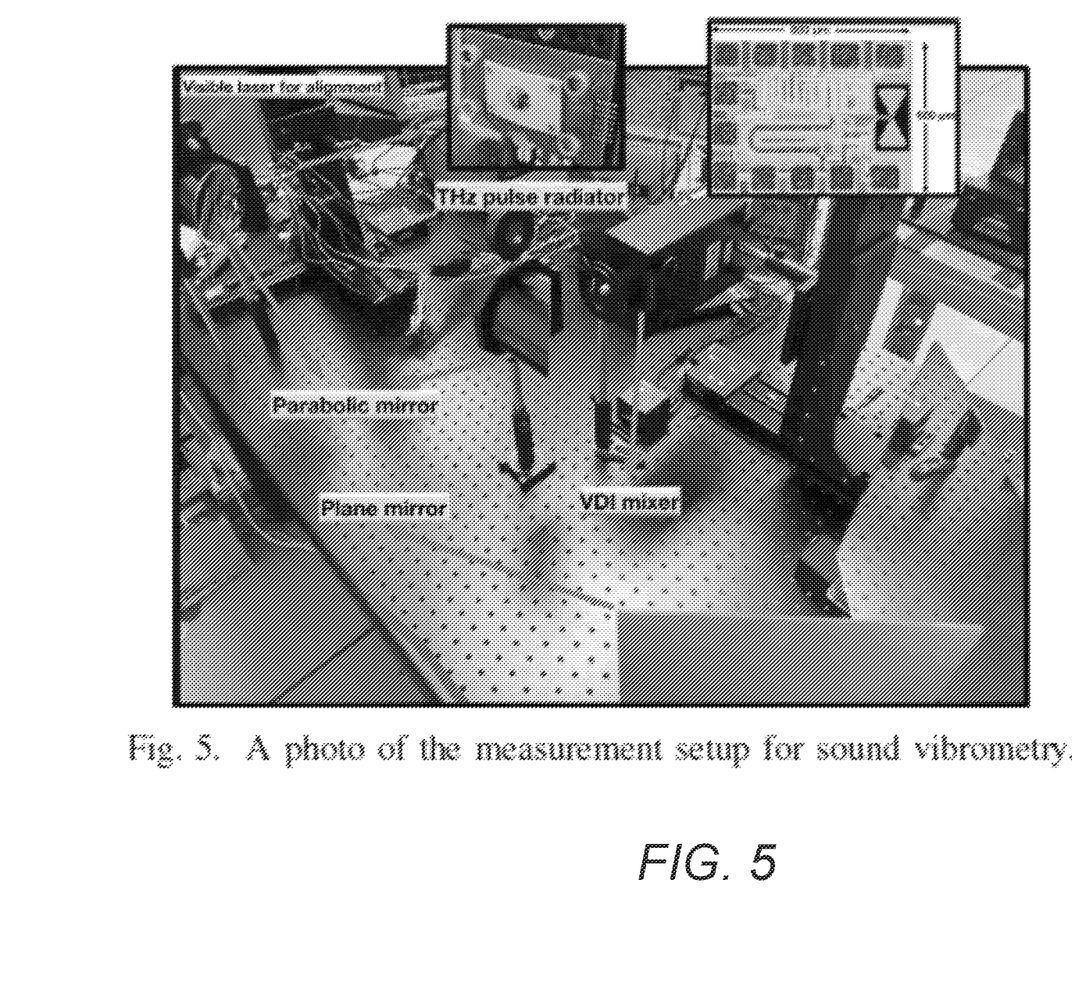
FIG. 5 illustrates a photo of a measurement setup for sound vibrometry in accordance with an embodiment of the invention.

A diagram of a measurement setup in accordance with an embodiment of the invention is illustrated in FIG. 2. In certain embodiments, off-axis parabolic mirrors can be used to collimate the THz radiation at the transmitter and focus it on a horn antenna at the receiver. A rigid plane mirror can be used to direct the collimated beam and pick up the mechanical sound vibrations from the speaker. A precise alignment may be important to maximize the received THz power. In several embodiments, the alignment may be performed with the aid of a visible light laser. A 1-mw visible laser can be used to precisely align the pulse radiator chip and mirrors, as illustrated in FIG. 5 in accordance with an embodiment of the invention. On the receiver side, a Virginia Diodes VDI Spectrum Analyzer Extender (SAX) in conjunction with a Keysight PXA9030N Signal Analyzer can be used to down-convert the received tones, which are in 320-500-GHz range. To recover the micro-Doppler side tones, AM/FM analog demodulation can be performed using Keysight N9063A application.

Figure 3:
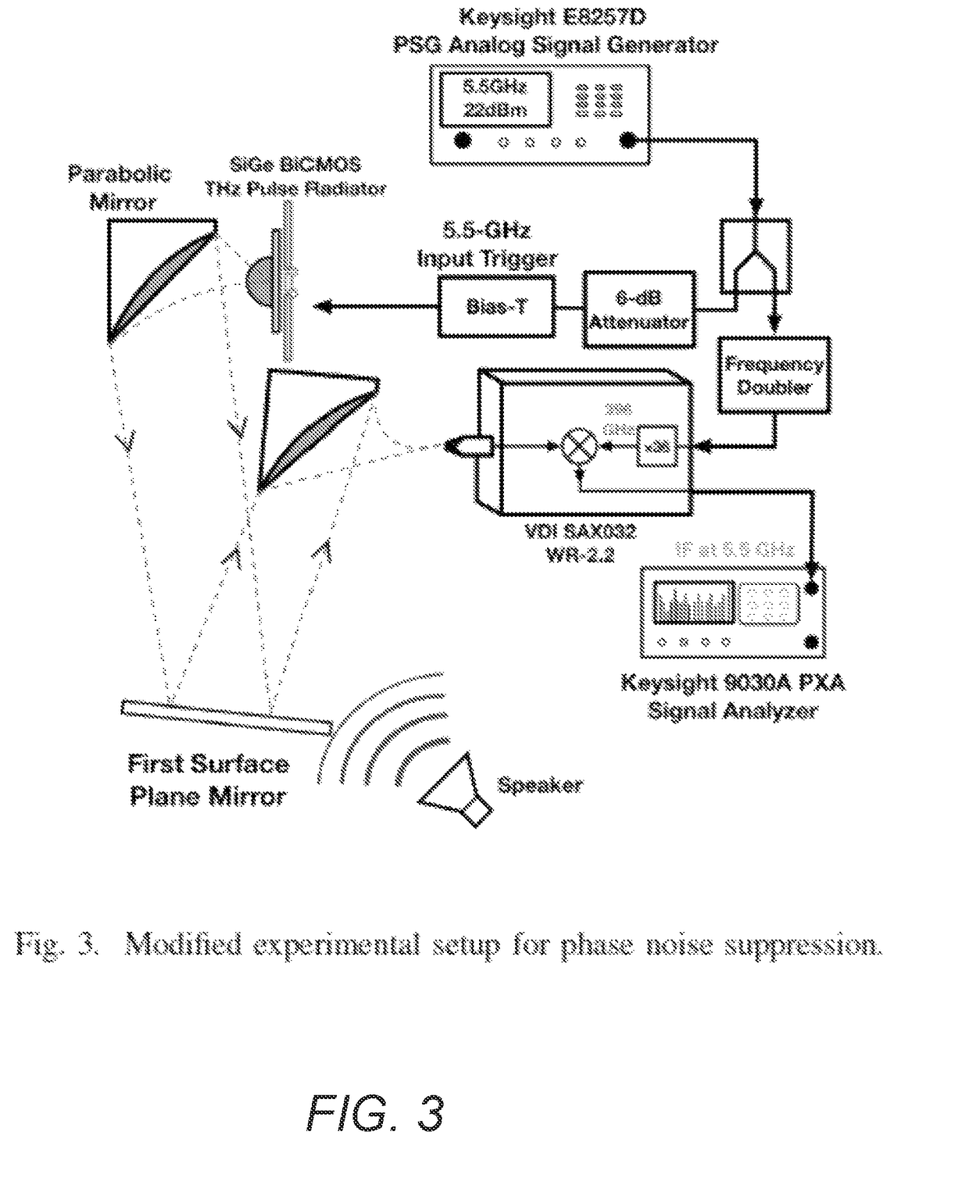
FIG. 3 illustrates a setup for phase noise suppression in accordance with an embodiment of the invention.
Figure 4:
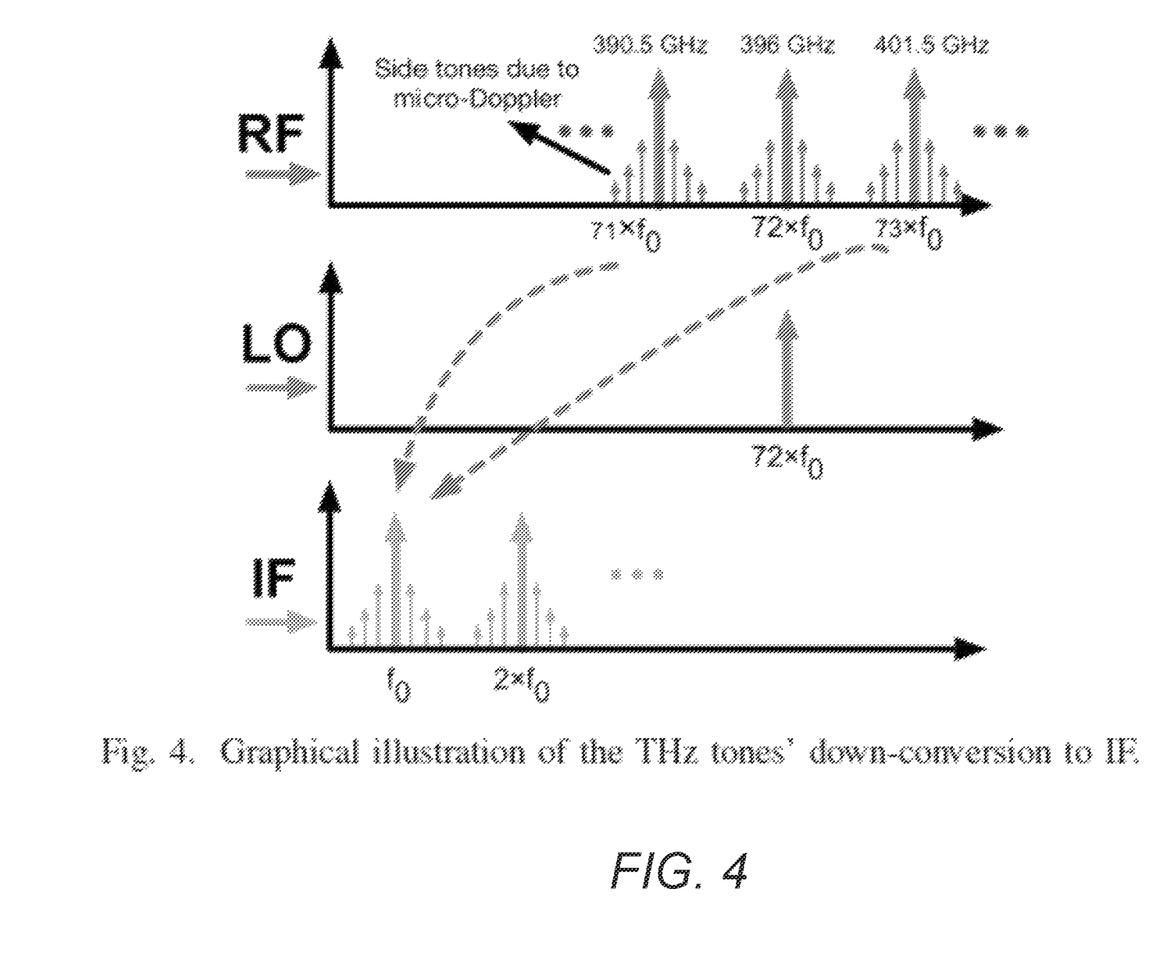
FIG. 4 illustrates a graphical illustration of the THz tones' down-conversion to IF.

Subtle vibrations generate low-power side tones that can fall below the skirt caused by the phase noise of the carrier. Considering the phase noise deterioration due to frequency multiplication in the THz radiator and the VDI SAX, the overall sensitivity of the system in accordance with many embodiments may be reduced significantly. Therefore, the summation of the uncorrelated phase noises of the radiated tones and the local oscillator (LO) signal may pose a challenge for capturing the micro-Doppler signature of weak vibrations. In order to address this problem, a measurement setup with phase noise suppression as illustrated in FIG. 3 in accordance with many embodiments of the invention may be utilized. In many embodiments, by splitting the power of the signal generator, the phase noise of the LO and the radiated tones can remain correlated, thereby mitigating the phase noise degradation of the radiated tones. The VDI SAX module consists of a ×36 multiplier which can convert the 5.5 GHz input to 396 GHz LO. In many embodiments, by feeding the same input to the pulse radiator chip, the tones at 401.5 and 390.5 GHz are down-converted to the IF of 5.5 GHz as shown in FIG. 4 in accordance with an embodiment of the invention. Due to the correlation of the phase noise of the chip and VDI SAX, the phase noise degradation due to frequency multiplication can be compensated. As a result, the sensitivity of the system in accordance with many embodiments can be significantly improved, which may enable the detection of weaker vibrations. A measurement setup in accordance with an embodiment of the invention is illustrated in FIG. 5

Although FIG. 2, 3 and FIG. 5 illustrate a particular measurement setup for the modulation and demodulation of sound using Micro-Doppler effect, any of a variety of measurement setups may be utilized as appropriate to the requirements of specific applications in accordance with embodiments of the invention.

Measurement Results

Figure 6:
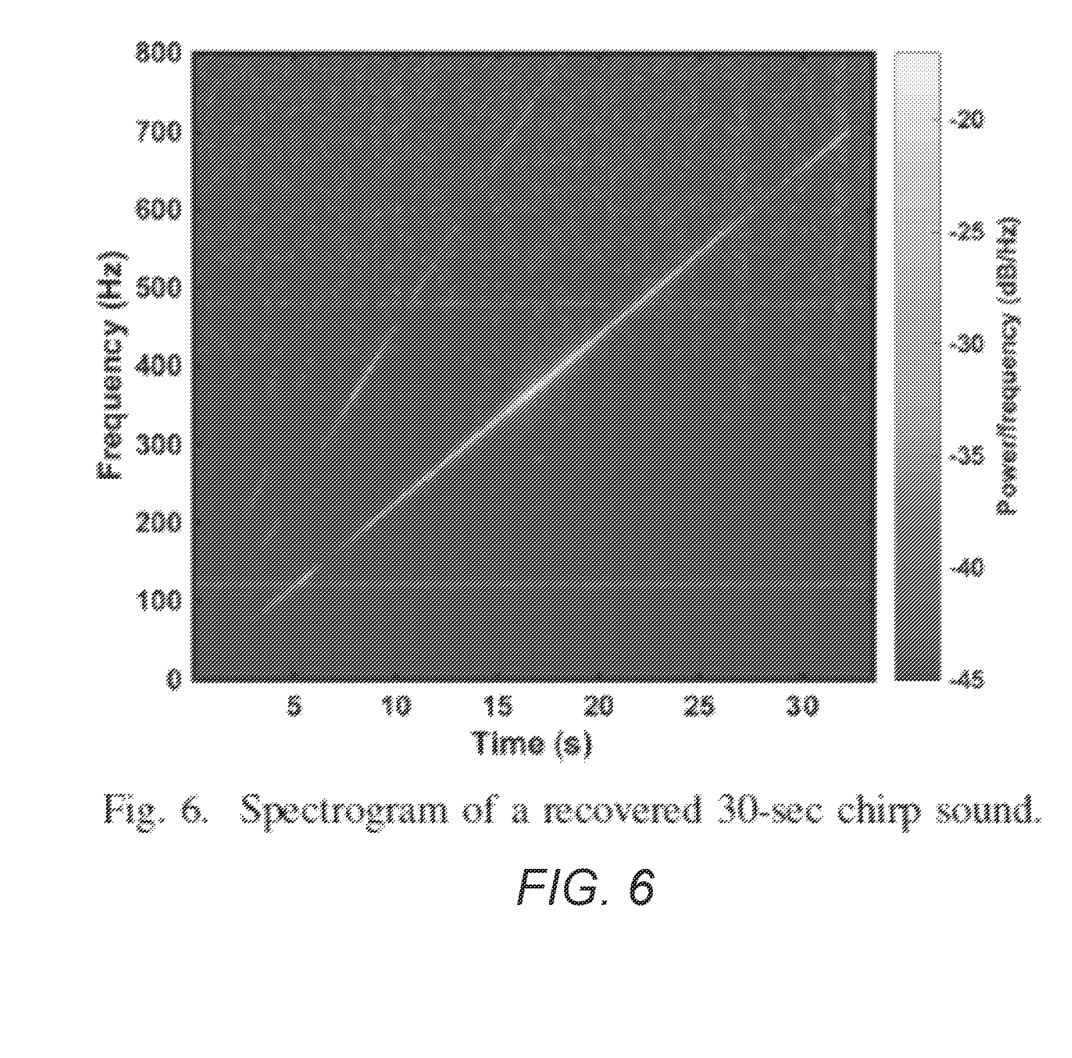
FIG. 6 illustrates a spectrogram of a recovered 30-sec chirp sound in accordance with an embodiment of the invention.
Figure 7A:
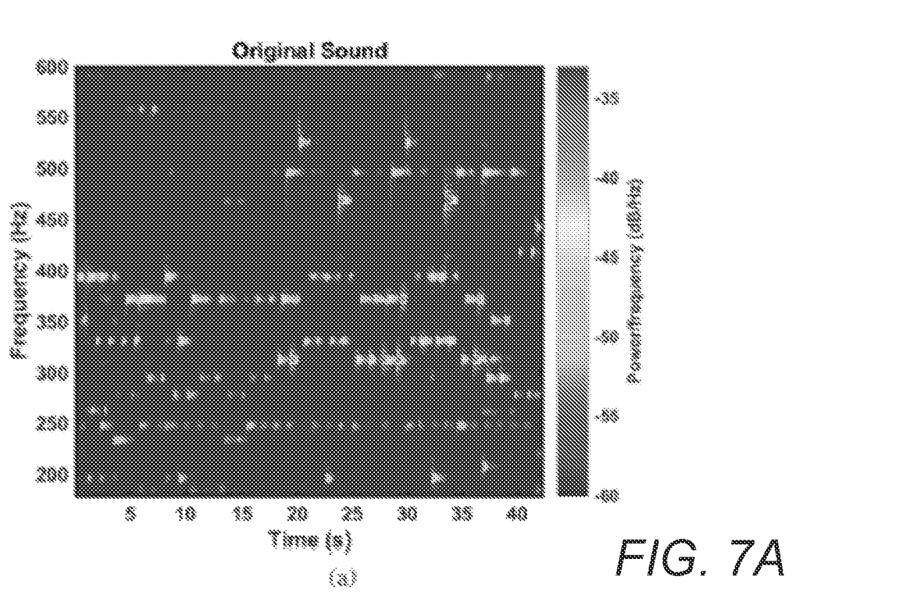
FIG. 7A illustrates an original sound and FIG. 7B illustrates the recovered sound track in accordance with an embodiment of the invention.
Figure 7B:
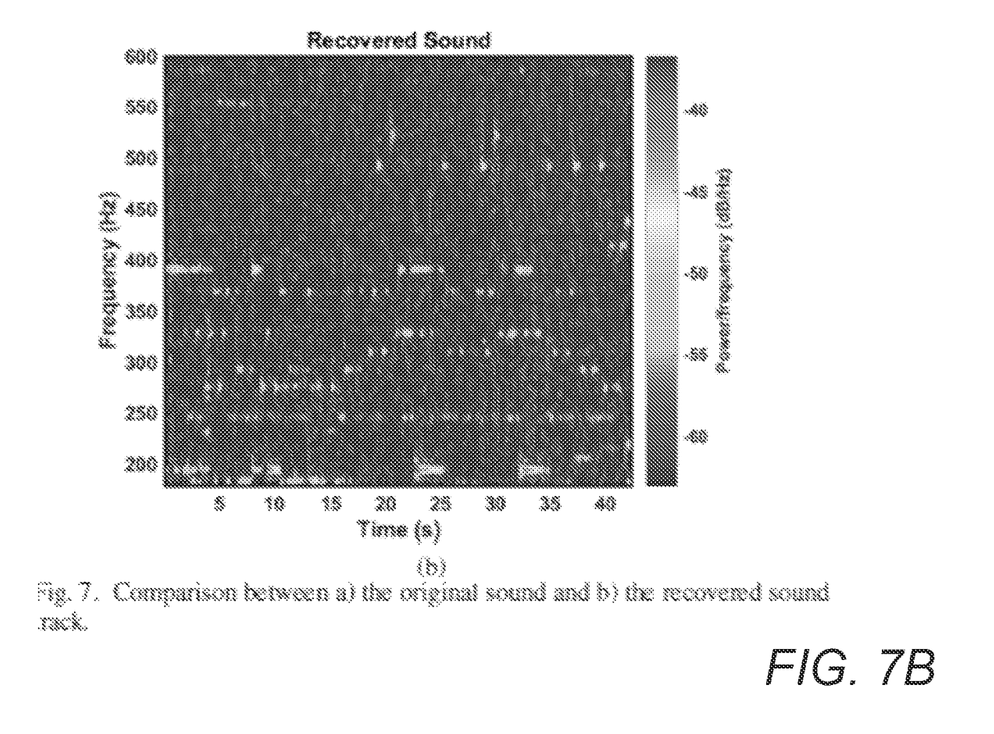

In an experiment, a 42-sec music track and a 30-sec chirp audio signal (50 to 700 Hz) were played via a speaker in proximity of the plane mirror (FIG. 2, FIG. 3). The sound was recovered at the receiver from the micro-Doppler signatures of the plane mirror. To avoid loss of information, the recovered sound may need to preserve the main frequency components of the original sound waves. FIG. 6 shows that fundamental frequency components of the recovered sound follow the original chirp sound. Additionally, In FIG. 7, the spectrogram of both the original music track and the reconstructed version are shown. It is explicit that the main frequency components in the spectrogram of the original track match with those in the recovered sound. It is evident that using this measurement setup, any arbitrary audio signal can be recovered from the vibrations.

Figure 8:
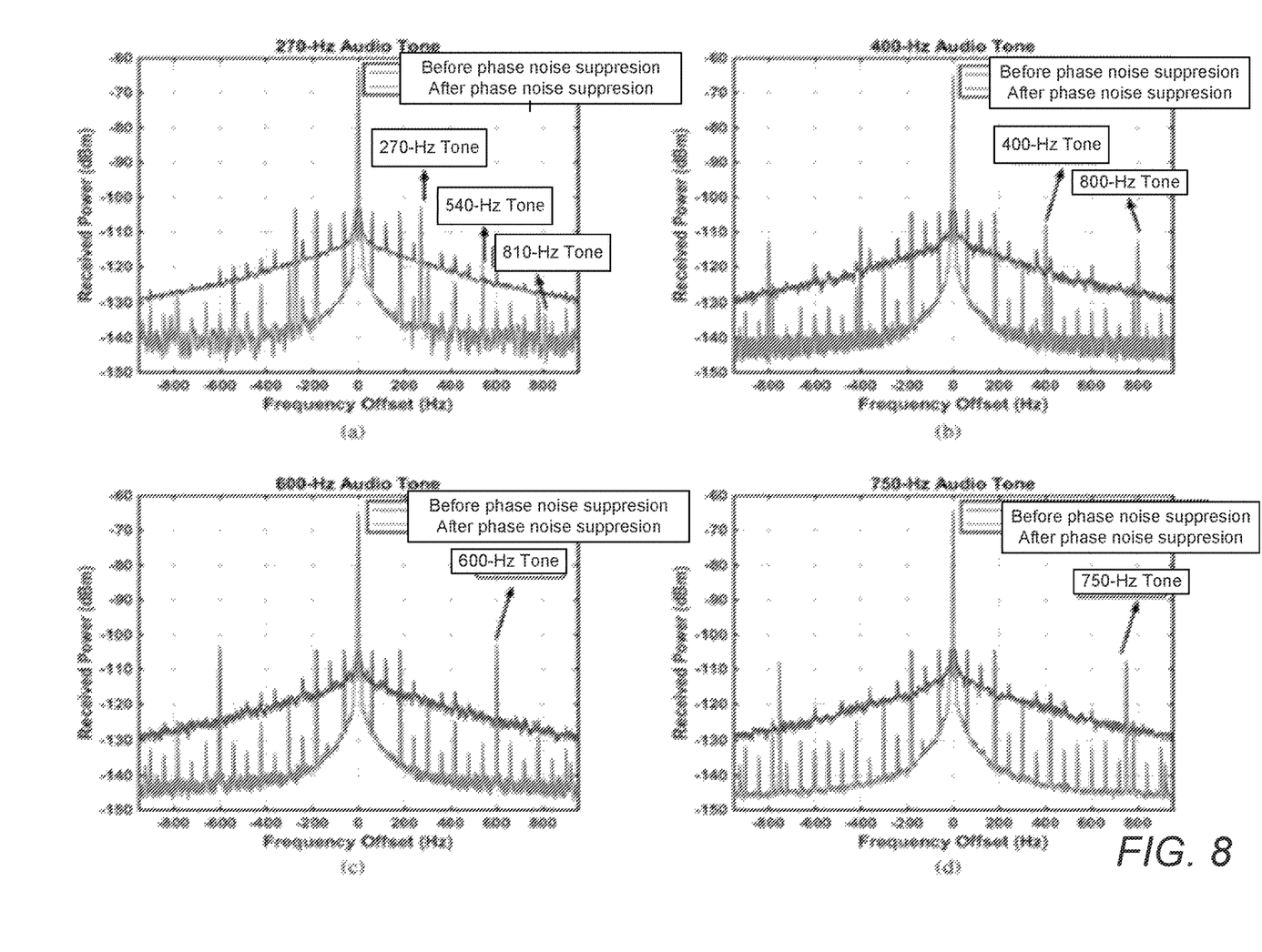
FIG. 8 illustrates frequency modulation for 4 different sounds tones: (a) 270 Hz, (b) 400 Hz, (c) 600 Hz, and (d) 750 Hz in accordance with an embodiment of the invention.

To demonstrate the frequency modulation of the carrier tone, single frequency tones at 270 Hz, 400 Hz, 600 Hz, and 750 Hz were produced by the speaker. Two separate measurements for the same amount of vibration (same displacement) were performed using the measurement setups of FIG. 2 (without phase noise suppression) and FIG. 3 (with phase noise suppression). The received tones after down-conversion are shown in FIG. 8. It can be seen that using the measurement setup of FIG. 3, the noise floor of the received tone has decreased by at least 20 dB for frequency offsets below 200 Hz and by 15 dB for frequency offsets below 1 kHz. For 270-Hz and 400-Hz audio tones, the FM side tones can be seen around the carrier frequency with the spacing set by the frequency of the sound vibration as predicted by the analysis described herein. As observed in FIG. 8, the coupling of the power lines and non-linearity of the system in accordance with an embodiment of the invention may cause spurious tones at 60 Hz and its harmonics, thereby limiting the sensitivity of the system at these frequencies.

Although specific implementations for non-contact based vibrometry at THz frequencies are discussed above with respect to FIGS. 1-8, any of a variety of implementations utilizing the above discussed techniques can be utilized for non-contact based vibrometry at THz frequencies in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A method for modulation and demodulation using a micro-Doppler effect, the method comprising:
   radiating, using a picosecond pulse generator with an antenna, a train of THz pulses that form a frequency comb comprising a plurality of tones, wherein the frequency comb is reflected from an object such that a frequency of the plurality of tones in the frequency comb are shifted based on the speed of the object and the reflected frequency comb includes a plurality of side tones that are generated due to mechanical movements or vibrations of the object; and
   down-converting the reflected frequency comb, including the plurality of side tones, to an intermediate frequency (IF) to recover a THz Doppler signature of the object.

2. The method of claim 1, wherein the antenna is on-chip and the train of THz pulses are generated on-chip and radiated by the on-chip antenna.

3. The method of claim 1, wherein the reflected frequency comb from the object is down-converted with another frequency comb and demodulated.

4. The method of claim 1, wherein the reflected frequency comb from the object is down-converted with a single tone.

5. The method of claim 1, further comprising identifying the object using a combination of the THz Doppler signature in a broad THz frequency range and the non-Doppler reflection from the object.

6. The method of claim 1, wherein different parts of the object move at different speeds and the reflected frequency comb comprises a plurality of THz Doppler tones.

7. The method of claim 1, wherein the object vibrates at a frequency equal or close to its mechanical resonance frequencies and the reflected frequency comb comprises a plurality of THz Doppler tones such that the THz Doppler tones are generated due to the vibration of the object.

8. The method of claim 1, wherein the THz Doppler signature caused by the vibration of the object is used to determine the object's mechanical and structural properties and predict failures in the object, wherein the object is at least one of a bridge, drone, plane, and building.

9. The method of claim 1, wherein the THz Doppler signature of the object is used along with a THz hyperspectral signature of the object to classify the object and determine at least one of its mechanical, physics, and chemical properties.

10. The method of claim 6, wherein the THz Doppler signature of the object is produced for multiple positions corresponding to different pixels of a distributed object such that each tone of the Doppler signature produced by each pixel of the object is combined to produce a Doppler image such that each pixel in the image represents a Doppler signature of a part of the object.

11. The method of claim 6, wherein the electromagnetic wavelength of THz Doppler tones incident on the object is much smaller than the size of the object such that the frequency comb can be focused on only a section of the object and Doppler signatures are produced for that particular section.

12. The method of claim 11, wherein the position of the focused frequency comb on the object is steered to produce at least one of a two and three dimensional image such that each pixel of the image contains a Doppler signature primarily generated by the part of the object that is located at the focused position.

13. The method of claim 6, wherein the electromagnetic wavelength of THz tones incident on the object is much smaller than the size of the object such that the frequency comb can be focused on only a section of the object and the Doppler signatures are primarily generated by that particular section.

14. The method of claim 1, wherein the THz Doppler signature is used to detect gas leaks in a pipeline such that the density of the gas changes the absorption of THz waves and a periodic movement of the gas generates the THz Doppler signature.

15. The method of claim 1, wherein the THz Doppler signature is used to determine the flow type of at least one of a gas and ions in a plasma, wherein the flow type is at least one of bubbly, slug, churn, annular, mist bubble, interacting bubble, churn turbulent bubble, and clustered bubble.

16. The method of claim 1, further comprising:
   collimating, using a plurality of off-axis parabolic mirrors, the train of THz pulses at a transmitter and focusing the train of THz pulses on an antenna on a receiver side;
   directing, using a plurality of mirrors, the collimated beam; and
   retrieving a base-band signal.

17. The method of claim 16, wherein the antenna is a horn antenna.

18. The method of claim 1, further comprising:
   feeding a trigger of the pulse radiator using a low-phase-noise input trigger; and
   increasing, using a silicon lens, the on-chip antenna radiation efficiency and gain of the pulse radiator.

19. The method of claim 18, wherein a frequency of the radiated tones is locked to a low-phase noise external source.

20. The method of claim 1, wherein a phase noise of a local oscillator (LO) and the radiated tones remain correlated to mitigate phase noise degradation of the radiated tones by feeding a same input to the picosecond pulse generator chip and the LO.

* * * * *